United States Patent
Inokuchi

(10) Patent No.: US 11,827,337 B2
(45) Date of Patent: Nov. 28, 2023

(54) GUST ALLEVIATION SYSTEM OF AIRPLANE, TURBULENCE DETECTION SYSTEM, FLUCTUATION ESTIMATION SYSTEM, DOPPLER LIDAR, AND GUST ALLEVIATION METHOD OF AIRPLANE

(71) Applicant: JAPAN AEROSPACE EXPLORATION AGENCY, Tokyo (JP)

(72) Inventor: Hamaki Inokuchi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 570 days.

(21) Appl. No.: 17/043,427

(22) PCT Filed: Mar. 29, 2019

(86) PCT No.: PCT/JP2019/014210
§ 371 (c)(1),
(2) Date: Sep. 29, 2020

(87) PCT Pub. No.: WO2019/194103
PCT Pub. Date: Oct. 10, 2019

(65) Prior Publication Data
US 2021/0016872 A1    Jan. 21, 2021

(30) Foreign Application Priority Data

Apr. 4, 2018  (JP) ................. 2018-072705

(51) Int. Cl.
*B64C 13/16*   (2006.01)
*G05D 1/10*    (2006.01)
(Continued)

(52) U.S. Cl.
CPC ............ *B64C 13/16* (2013.01); *B64C 9/00* (2013.01); *B64D 45/00* (2013.01); *G01P 5/26* (2013.01); *G05D 1/106* (2019.05)

(58) Field of Classification Search
CPC ........... B64C 13/16; B64C 9/00; B64D 45/00; G01P 5/26; G05D 1/106; G01S 7/4817;
(Continued)

(56) References Cited

U.S. PATENT DOCUMENTS 4,171,115 A    10/1979  Osder
4,894,658 A    1/1990   Hecht-Nielsen et al.
(Continued)

FOREIGN PATENT DOCUMENTS

EP    2 442 136 A1    4/2012
JP    54-88600 A      7/1979
(Continued)

OTHER PUBLICATIONS

Supplementary European Search Report dated Nov. 30, 2021 in European Application No. 19780631.8.
(Continued)

*Primary Examiner* — Donald J Wallace
*Assistant Examiner* — Jalal C Coduroglu
(74) *Attorney, Agent, or Firm* — Saliwanchik, Lloyd & Eisenschenk

(57) ABSTRACT

[Object] To provide a technique for reducing the fluctuation of an airplane when an airplane enters turbulence without using prior information of two-dimensional or more airflow vectors.
[Solving Means] A system includes: a measurement unit 10 that emits electromagnetic waves toward a planned flight direction of the airplane, receives scattered waves of the emitted electromagnetic waves in atmosphere, and measures a remote wind speed in a radiation axis direction of the
(Continued)

emitted electromagnetic waves based on a Doppler shift amount of a frequency between the emitted electromagnetic waves and the scattered electromagnetic waves; a spoiler 221 that controls a lift of the airplane; and a control calculation unit 30 that calculates an angle of attack with less lift inclination and calculates an angle of the spoiler 221 that controls the lift so that the lift does not change when it is determined that the airplane will receive a gust, based on a measurement result of the measurement unit 10.

11 Claims, 18 Drawing Sheets

(51) Int. Cl.
 *B64C 9/00* (2006.01)
 *B64D 45/00* (2006.01)
 *G01P 5/26* (2006.01)
(58) Field of Classification Search
 CPC ........ G01S 13/18; G01S 13/52; G01S 13/953; G01S 17/58; G01S 17/87; G01S 17/95; G01W 2001/003; Y02T 50/30; Y02T 50/40
 See application file for complete search history.

(56) References Cited

U.S. PATENT DOCUMENTS

| | | | |
|---|---|---|---|
| 5,237,331 A | 8/1993 | Henderson et al. | |
| 6,246,929 B1* | 6/2001 | Kaloust | G05D 1/0816 701/5 |
| 6,751,532 B2 | 6/2004 | Inokuchi | |
| 8,434,358 B2 | 5/2013 | Asahara et al. | |
| 8,774,987 B2* | 7/2014 | Walton | B64C 13/16 701/4 |
| 8,939,056 B1* | 1/2015 | Neal, III | F42B 15/22 89/1.51 |
| 9,070,284 B2 | 6/2015 | Inokuchi et al. | |
| 9,097,799 B2 | 8/2015 | Inokuchi | |
| 2002/0164559 A1* | 11/2002 | Ransom | B64G 7/00 434/37 |
| 2003/0009268 A1* | 1/2003 | Inokuchi | G01S 17/58 701/14 |
| 2009/0048723 A1* | 2/2009 | Nugent | B64C 13/16 701/10 |
| 2010/0195100 A9* | 8/2010 | Caldwell | G01S 17/87 356/341 |
| 2010/0219299 A1 | 9/2010 | Holzhausen | |
| 2011/0134412 A1* | 6/2011 | Inokuchi | G01S 17/95 356/28.5 |
| 2011/0172919 A1* | 7/2011 | Inokuchi | G08G 5/0039 701/301 |
| 2011/0219869 A1 | 9/2011 | Asahara et al. | |
| 2011/0291879 A1 | 12/2011 | Mandle | |
| 2013/0228010 A1* | 9/2013 | Bertolotti | G01S 15/885 73/170.16 |
| 2013/0282285 A1* | 10/2013 | Boquet | G01P 5/26 702/3 |
| 2015/0028162 A1* | 1/2015 | Wildschek | G05D 1/00 244/76 C |
| 2015/0197335 A1* | 7/2015 | Dekel | B64C 27/52 701/5 |
| 2016/0114903 A1 | 4/2016 | Claudel et al. | |
| 2016/0293021 A1* | 10/2016 | Shipley | G08G 5/0052 |
| 2017/0057621 A1 | 3/2017 | Evulet | |
| 2017/0057647 A1 | 3/2017 | Evulet | |
| 2017/0057648 A1 | 3/2017 | Evulet | |
| 2017/0144748 A1* | 5/2017 | Mayo | B64C 13/506 |
| 2018/0156893 A1 | 6/2018 | Kotake et al. | |
| 2018/0312268 A1 | 11/2018 | Evulet | |
| 2019/0047712 A1 | 2/2019 | Evulet | |
| 2019/0112062 A1 | 4/2019 | Evulet | |
| 2019/0118958 A1 | 4/2019 | Evulet | |
| 2019/0154439 A1* | 5/2019 | Binder | G01B 11/26 |
| 2019/0193864 A1 | 6/2019 | Evulet | |
| 2020/0023987 A1 | 1/2020 | Evulet | |
| 2020/0354071 A1 | 11/2020 | Evulet | |
| 2022/0041297 A1 | 2/2022 | Evulet | |

FOREIGN PATENT DOCUMENTS

| | | |
|---|---|---|
| JP | 2001039397 A * | 2/2001 |
| JP | 2010-509118 A | 3/2010 |
| JP | 2011-105248 A | 6/2011 |
| JP | 2011-185773 A | 9/2011 |
| JP | 4859208 B2 | 1/2012 |
| JP | 5376459 B2 | 12/2013 |
| JP | 5398001 B2 | 1/2014 |
| JP | 5696987 B2 | 4/2015 |
| JP | 5717174 B2 | 5/2015 |
| JP | 57771893 B2 | 9/2015 |
| JP | 2015-195895 A | 11/2015 |
| WO | WO-2016/181493 A1 | 11/2016 |
| WO | 2017/041018 A1 | 3/2017 |

OTHER PUBLICATIONS

Office Action dated Feb. 10, 2022 in Japanese Application No. 2018-072705.
International Search Report in International Application No. PCT/JP2019/014210, filed Mar. 29, 2019.
Inokuchi, H. et al., "Development of an Onboard Doppler Lidar for Flight Safety," *Journal of Aircraft*, Jul.-Aug. 2009, 46(4):1411-1415, American Institute of Aeronautics and Astronautics, Inc.
Abbott, I. H. et al., "Theory of Wing Sections Including a Summary of Airfoil Data," pp. 1-8, Dover Publications, Inc.
"Airworthiness standards," *Japan Transport Safety Board*, pp. 1-23, with partial English translation.
Office Action dated Jul. 25, 2023 in European Application No. 19 780 631.8.

* cited by examiner

GUST ALLEVIATION SYSTEM OF AIRPLANE, TURBULENCE DETECTION SYSTEM, FLUCTUATION ESTIMATION SYSTEM, DOPPLER LIDAR, AND GUST ALLEVIATION METHOD OF AIRPLANE

CROSS-REFERENCE TO RELATED APPLICATIONS

This application is the U.S. national stage application of International Patent Application No. PCT/JP2019/014210, filed Mar. 29, 2019, which claims the benefit under 35 U.S.C. § 119 of Japanese Application No. 2018-072705, filed Apr. 4, 2018, the disclosures of each of which are incorporated herein by reference in their entirety.

TECHNICAL FIELD

The present invention relates to a gust alleviation system and method used to reduce vertical fluctuation of an airplane, for example, when an airplane flies in a turbulence, and to a turbulence detection system, a fluctuation estimation system, and a Doppler LIDAR suitable for use in these techniques.

BACKGROUND ART

Turbulence is particularly important as a main cause of passenger airplane accidents, and a technique related to a Doppler LIDAR using a laser light has been investigated and developed as a device mounted on an airplane for detecting a turbulence in advance (for example, see Non-Patent Literature 1).

In order to use the Doppler LIDAR for preventing inhibiting air turbulence accidents of airplanes, there are a method in which turbulence information in front of the flight direction is transmitted to a pilot and the pilot deals with such problems by means of avoidance flight and seat belt sign lighting, a method in which airflow information is transmitted to an onboard computer to automatically control a control surface to reduce fluctuation of an airplane at the time of turbulence inrush, and the like (for example, see Patent Literature 1).

In order to control the above control surface, it is generally necessary to obtain the vertical airflow vector. The present inventors have proposed a technique for obtaining a vertical airflow vector by geometrically converting the observed values by two sets of Doppler LIDAR (remote airflow measuring device) in Patent Literature 2.

Furthermore, the present inventors propose, in Patent Literature 3, a remote airflow measuring apparatus, a remote airflow measuring method, and a program capable of improving the estimation accuracy of the two-dimensional airflow vector including a vertical airflow vector and in addition realizing a wider airflow estimation range.

Note that in the case of a system in which the control surface is automatically controlled using the airflow vector as prior information of gust alleviation control, it has become an obstacle to practical application because two or more sets of observation directions by a remote airflow measuring device are necessary, because extremely high reliability is required for the prior information, and because elastic deformation of the airplane must be considered.

CITATION LIST

Patent Literature

Patent Literature 1: Japanese Patent No. 5771893
Patent Literature 2: Japanese Patent No. 5398001
Patent Literature 3: Japanese Patent Application Laid-open No. 2015-195895
Patent Literature 4: Japanese Patent No. 4859208
Patent Literature 5: Japanese Patent No. 5376459
Patent Literature 6: Japanese Patent No. 5696987
Patent Literature 7: Japanese Patent No. 5717174

Non-Patent Literature

Non-Patent Literature 1: H. Inokuchi, H. Tanaka, and T. Ando, "Development of an Onboard Doppler LIDAR for Flight Safety," Journal of Aircraft, Vol. 46, No. 4, PP. 1411-1415, AIAA, July-August, 2009.
Non-Patent Literature 2: Ira H. Abbott, Albert E. Von Doenhoff, "Theory of Wing Sections," Dover Publications, Inc.
Non-Patent Literature 3: Ministry of Land, Infrastructure, Transport and Tourism, Japan Civil Aviation Bureau, Japan Transport Safety Board, "Airworthiness standards", HOBUN SHORIN CO., LTD

DISCLOSURE OF INVENTION

Technical Problem

First, the principle in which an airplane fluctuates when an airplane rushes into turbulence, will be described schematically. The fluctuation is up, down, left, right, front, and back motion, but here, only the up-and-down motion that is likely to cause an accident will be focused on. The airflow directions related to the up-and-down motion are mainly the vertical wind and the fore-and-aft wind for the traveling direction of the airplane.

When the vertical wind changes, the relative airflow vector to the airplane changes due to the synthesis with the forward speed of the airplane. That is, since the lift is changed because of change of the angle of attack, the airplane fluctuates up-and-down. When there is a change in the fore-and-aft wind, it brings a change in the dynamic pressure, the lift changes in the same way, and the airplane fluctuates up-and-down. The above two phenomena occur simultaneously in turbulent airflow, but may be considered separately in principle. Generally speaking, the effect of vertical wind is considered to be larger than that of fore-and-aft wind.

More than two optical axes are required for vertical and fore-and-aft airflow estimation of gusts using a Doppler LIDAR. In the case of observations in two up-and-down directions in front, a rigorous two-dimensional airflow vector is given only when the laser light is irradiated at the point where the airflow is estimated, but since the distance between the laser optical axes is widened in the aircraft front, the assumption of the geometrical transformation collapses and it becomes difficult to carry out the airflow estimation correctly. There is a dilemma that the conversion error of the vector becomes large, when the angle between the two up-and-down directions is reduced in order to reduce this effect. For a test Doppler LIDAR constructed so far, the measurement accuracy of the optical axis along the line of sight is 0.2 to 0.3 m/s from the results of Monte Carlo simulations. When this is converted into a vertical airflow vector, the estimation accuracy is 0.6 to 0.9 m/s when the angle therebetween is 20 degrees. Moreover, this is only a geometrical estimation calculation, and in reality, the error may become large due to the effect of complicated local flow.

In the case of a system that automatically controls an elevator according to prior information of the airflow vector of two or more dimensions, wrong prior information has been an obstacle to practical use because it requires extremely high accuracy and reliability in the prior information because of the possibility of exciting the airplane, and because it is necessary to consider elastic deformation because the airplane is deformed by maneuvering.

An object of the present invention to provide a technique for reducing the fluctuation of an airplane when the airplane enters turbulence without using prior information of two-dimensional or more airflow vectors.

Solution to Problem

To achieve the above object, a gust alleviation system of an airplane according to an embodiment of the present invention includes: a measurement unit that emits electromagnetic waves toward a planned flight direction of the airplane, receives scattered waves of the emitted electromagnetic waves in atmosphere, and measures a remote wind speed in a radiation axis direction of the emitted electromagnetic waves based on a Doppler shift amount of a frequency between the emitted electromagnetic waves and the scattered electromagnetic waves; a control surface that controls a lift of the airplane; and a control calculation unit that calculates an angle of attack with less lift-curve slope and calculates an angle of the control surface that controls the lift so that the lift does not change when it is determined that the airplane will receive a gust, based on a measurement result of the measurement unit.

A gust alleviation method of an airplane according to an embodiment of the present invention including: emitting electromagnetic waves toward a planned flight direction of the airplane, receiving scattered waves of the emitted electromagnetic waves in atmosphere, and measuring a remote wind speed in a radiation axis direction of the emitted electromagnetic waves based on a Doppler shift amount of a frequency between the emitted electromagnetic waves and the scattered electromagnetic waves; and calculating an angle of attack with less lift-curve slope and calculates an angle of the control surface that controls the lift so that the lift does not change when it is determined that the airplane will receive a gust, based on a measurement result.

A turbulence detection system according to an embodiment of the present invention includes: a measurement unit that emits electromagnetic waves toward a planned flight direction of the airplane, receives scattered waves of the emitted electromagnetic waves in atmosphere, and measures a remote wind speed in a radiation axis direction of the emitted electromagnetic waves based on a Doppler shift amount of a frequency between the emitted electromagnetic waves and the scattered electromagnetic waves; and a control calculation unit that calculates an intensity index of a turbulence in the planned flight direction of the airplane based on a measurement result of the measurement unit, in which the control calculation unit uses, as the intensity index of the turbulence, a product of a wind speed change amount in a radiation axis direction of electromagnetic waves radiated, flight speed, and a density of the atmosphere or a static pressure.

The control calculation unit may determine a wind speed width in a range bin from an increase in a power spectral width of scattering in the range bin as the amount of wind speed change in the radiation axis direction, and may represent a value of an intensity of a turbulence by the wind speed width.

A fluctuation estimation system according to an embodiment of the present invention includes: a measurement unit that emits electromagnetic waves toward a planned flight direction of the airplane, receives scattered waves of the emitted electromagnetic waves in atmosphere, and measures a remote wind speed in a radiation axis direction of the emitted electromagnetic waves based on a Doppler shift amount of a frequency between the emitted electromagnetic waves and the scattered electromagnetic waves; and a control calculation unit that calculates an index for a degree at which the airplane fluctuates based on a measurement result of the measurement unit, in which the control calculation unit, as an index of a degree that the airplane fluctuates, removes a high component and a low component of frequency of fluctuation and uses a value of maximum acceleration that continuous for a fixed time period.

A Doppler LIDAR according to an embodiment of the present invention includes: a measurement unit that emits light waves toward a planned flight direction of the airplane, receives scattered waves of the emitted electromagnetic waves in atmosphere, and measures a remote wind speed in a radiation axis direction of the emitted electromagnetic waves based on a Doppler shift amount of a frequency between the emitted light waves and the scattered light waves; and a scanner that changes a direction of the light waves and has a condensing function of an optical telescope.

Advantageous Effects of Invention

According to the present invention, without using the prior information of the two-dimensional or more airflow vectors, it is possible to reduce the fluctuation of an airplane when an airplane enters a turbulence.

The gust alleviation system of an airplane according to the present technology includes: a measurement unit that emits electromagnetic waves toward the planned flight direction of an airplane, receives scattered waves in the atmosphere, measures a remote wind speed in the radiation axis direction based on the Doppler shift amount of the frequency between the emitted electromagnetic waves and the scattered electromagnetic waves; a control surface that controls the lift of the airplane; and a control calculation unit that calculates an angle of attack with less lift-curve slope and calculates an angle of control surface that controls the lift such that the lift does not change, when it is found that the airplane is subjected to gust based on the measurement result of the measurement unit.

As the electromagnetic wave to be radiated, mainly laser light is assumed, radio waves such as microwaves may also be used.

The change in lift due to the change in the angle of attack of the airflow and the change in lift due to the change in dynamic pressure are shown below, respectively.

Assuming that the angle of attack in the absence of wind is a and the flight speed is V, the lift L may be approximately obtained by the following equation from the theory of the two-dimensional wing.

$$L = \pi \rho V^2 (\alpha - \alpha_0) S \quad (1)$$

Where
$\rho$ denotes density of the atmosphere,
$\alpha_0$ denotes zero lift angle of attack, and
S denotes wing area.

Figure 1:
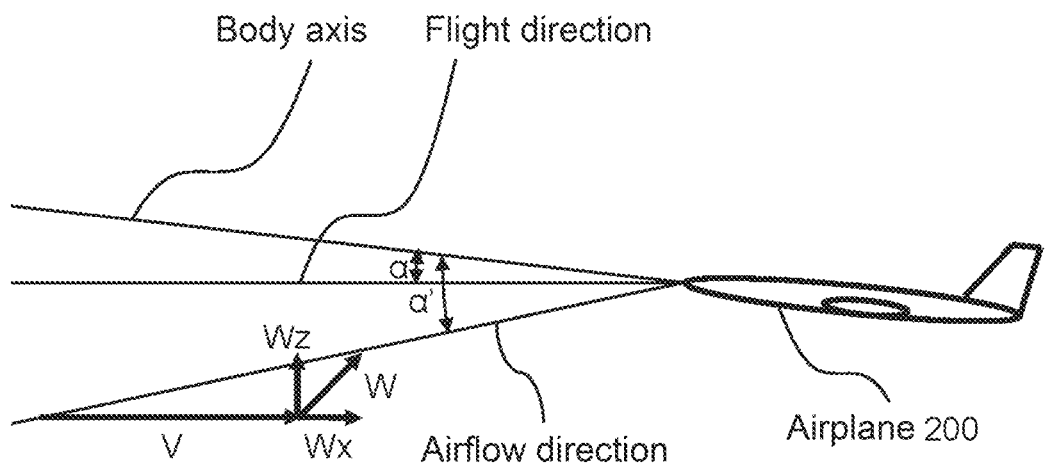
FIG. 1 A diagram showing the definition of the airflow vector when encountered gust during flight.

FIG. 1 shows a case where a gust is encountered during flight. If the wind vector relative to the airplane 200 is W, the vertical component is $W_Z$, and the fore-and-aft component is $W_X$, then the angle of attack $\alpha'$ may be determined by the following equation.

$$\alpha' = \alpha - \tan^{-1}(W_Z/(V+W_Z)) \quad (2)$$

Considering that the flight speed V is sufficiently large for the gust W, Equation 2 may be simplified as follows.

$$\alpha' = \alpha + W_Z/V \quad (3)$$

Therefore, the lift change $\Delta L$ caused by the change of the angle of attack due to the gust may be obtained by the following equation.

$$\Delta L = \pi \rho V W_Z S \quad (4)$$

That is, it may be said that the lift change $\Delta L$ caused by the change of the angle of attack due to the gust is substantially proportional to the product of the density of the atmosphere p, the flight speed V, and the vertical component $W_Z$ of the gust.

Next, the vertical fluctuation in the case where the dynamic pressure changes due to the back-and-forth wind will be described. The lift L in the absence of wind is obtained by the following equation.

$$L = (1/2) \rho V^2 C_L S \quad (5)$$

Where
$C_L$ denotes lift coefficient.

Therefore, the lift change $\Delta L$ caused by the dynamic pressure change due to the gust may be obtained by the following equation.

$$\Delta L = \rho C_L S (V W_X + (1/2) W_X^2) \quad (6)$$

Here, since $W_X$ is normally smaller than V, omitting the $(1/2) W_X^2$ yields the following equation.

$$\Delta L = \rho C_L S V W_X \quad (7)$$

That is, it may be said that the lift change $\Delta L$ caused by the dynamic pressure change due to the gust is substantially proportional to the product of the density of the atmosphere p, the flight speed V, and the fore-and-aft component $W_X$ of the gust.

Assuming that the turbulence is isotropic, it may be said that the vertical fluctuation of the airplane due to turbulence is approximately proportional to the product of the density of the atmosphere $\rho$, the flight speed V, and the gust W. Therefore, it is reasonable to use the product $\rho VW$ for the intensity index of turbulence. Although the isotropy varies to some extent, it is generally considered that the isotropy has correlation. Although there is an Fh factor as a technique for representing the product of the flight speed V and the gust W (Patent Literature 4), as a technique for representing the gust W, the wind speed dispersion value indicated by the spectral width of the received light in the observation area may be used. Since the density of the atmosphere $\rho$ is proportional to the static pressure $P_S$ measured at the static pressure hole for determining the atmospheric pressure altitude, $P_S VW$ may be used as the turbulence strength index.

The static pressure $P_S$ or the density of the atmosphere $\rho$ and the flight speed V are measured with Pitot-static tubes equipped with every airplane. The flight speed V and the gust W in front may be measured, for example, with a Doppler LIDAR. For this reason, in the gust alleviation system of the present invention, for example, a laser light is radiated (transmitted) into the atmosphere as a transmission signal, and the laser scattered light of the laser light scattered by the aerosol in the atmosphere is received as a reception signal, and the wind speed of the airflow in the remote region is measured based on the Doppler shift amount of the frequency between the transmission signal and the reception signal by using a Doppler LIDAR to observe the gust in front, thereby realizing the gust alleviation of the airplane by automatic control of the control surface.

<Principle of Gust Alleviation>

Figure 2:
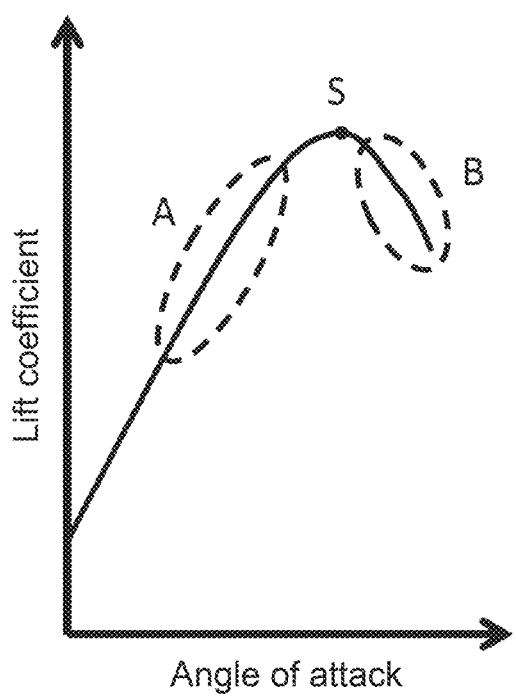
FIG. 2 A diagram schematically showing lift characteristics of a general airfoil.

FIG. 2 is a diagram schematically representing the lift characteristics of a general airfoil. The point S is referred to as the stall point, the region A is referred to as the front side, and the region B is referred to as the back side.

In the region of A, when the pilot pulls the control column, the airplane ascends because the attitude faces upward and the lift increases in the short term. This is a natural behavior for human senses. In the long term, since the flight speed decreases, the lift decreases and the airplane descends, but in the present invention, the motion is considered only in the short term since the motion reduction is described. For motion in the long term, the engine power may be adjusted in the normal operation.

In the region B, contrary to the region A, the lift decreases and the airplane descends when the control column is pulled, so special care should be taken when a human is maneuvering. Normally, the control column is pushed to return to the region A. It is not necessarily a dangerous region, and it is also positively utilized in powered lift aircraft, etc.

In the vicinity of the point S, the up-and-down motion of the airplane is suppressed because the change of lift coefficient is small for the change of the angle of attack, and the change of lift is small even if the vertical wind changes. Note that, if the angle of attack is increased to shift to the point S when flying in the region A, the airplane will ascend, so it is necessary to appropriately control the lift in order to maintain the horizontal flight.

As the control surface for controlling the lift, for example, a spoiler is assumed. Flaperons for varying the left and right ailerons in the same phase may be used alternatively, or the both may be used in combination.

Figure 3:
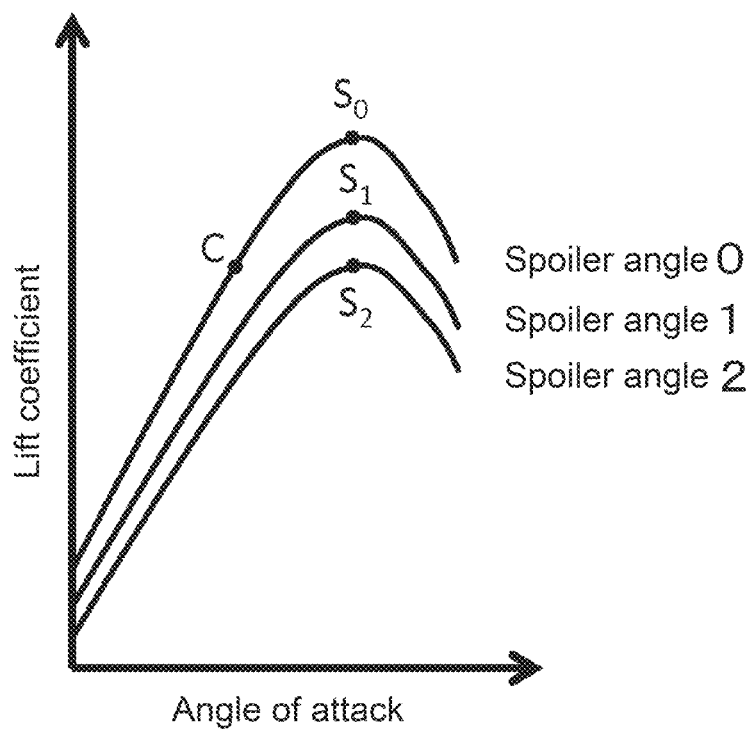
FIG. 3 A diagram schematically showing a lift change according to the spoiler angle.

FIG. 3 schematically shows how the lift coefficient changes with changes in the spoiler angle. When the spoiler is deployed, the lift coefficient decreases and the lift change near the point S decreases.

When the airplane attempts to fly at the point S0 by increasing the angle of attack while cruising at the point C, the lift increases and the airplane thereby ascends. When the spoiler is deployed so that the lift coefficient becomes the point S2 in order to inhibit this ascending, the drag force actually increases in accordance with the increase in the angle of attack, and the flight speed decreases, so that the lift decreases and the flight altitude decreases. Therefore, in order to maintain the flight altitude, if the spoiler angle is controlled so as to be the point S1 between the point S0 and the point S2, the horizontal flight may be performed, and since the change in the lift due to the change in the angle of attack is small, it is possible to reduce the motion of the airplane due to the change in the vertical wind. Since it is a quasi-static control, the effect of the elastic deformation of the airplane does not occur.

During cruising, the airplane flights at the most efficient angle of attack, where the normal lift-to-drag ratio is the maximum, so when the angle of attack is changed, it may become impossible to fly horizontally with the same thrust as it is. If the point $S_1$ gradually approaches the point $S_0$ over time, and eventually falls even if the spoiler angle reaches zero, the thrust must be increased prior to the spoiler angle becoming zero. The thrust increasing operation may be automatic or manual. It is usually included in the autopilot function.

As described above, since the degree of airplane fluctuation caused by turbulence is proportional to the flight speed, a synergistic effect may also be expected in which the airplane fluctuation is reduced as a result of an increase in the angle of attack and a decrease in flight speed due to the deployment of spoilers.

The change of lift due to the change of the fore-and-aft wind cancels the change of lift by changing the spoiler angle in accordance with the measurement value of the fore-and-aft wind in front of the airplane. Compatibility of the quasi-static control for the change of vertical wind and the dynamic control for the change of fore-and-aft wind is possible. In addition, since the control to offset the change in the lift caused by the fore-and-aft wind typically controls the lift directly by the spoiler installed on the wing that generates the lift, it is less susceptible to the elastic deformation of the airplane. This point is a greatly different advantage from the lift control by the control of the elevator.

Deployment of the spoiler in this manner reduces the lift-drag ratio and reduces the efficiency of the flight. However, since this system operates only temporarily when entering the turbulence detected in advance by the Doppler LIDAR, it is expected that fuel consumption will be reduced because there is no need to avoid the region where turbulence is assumed to be large when considering the entire operation. Alternatively, in the case of the same flight path, an improvement in safety may be expected.

A hardware constraint of the observation by the Doppler LIDAR used in one aspect of the present invention is that the range of observable wind speed is limited. For this reason, when used on board in an airplane, a method is adopted in which the change from the subtracted speed is measured by subtracting the flight speed. In Patent Literature 5, the average value of the immediately preceding observation value is regarded as the flight speed, but even when the signal to noise ratio of the received signal is high, an abnormal value may be included in the observation value, so that it has been found that the average value is inconvenient. For this reason, in the gust alleviation system of an airplane according to an embodiment of the present invention, the mode (the mode value) of the immediately preceding observation value is regarded as the flight speed.

In order to calculate the mode, it is necessary to generate a histogram by dividing the observed value in a finite wind speed range, so that the resolution of the flight speed measurement value will depend on the division width of the wind speed. Note that since the flight speed may be approximated, it is only necessary to put the airplane into the range where the wind speed may be observed.

On the other hand, when used for the purpose of measuring the flight speed itself, the abnormal value is excluded based on the standard deviation from the histogram and the average value of only the normal observed value is obtained, and then the flight speed with high reliability and accuracy may be obtained.

As a side effect when the control surface for controlling the lift is dynamically operated, the longitudinal attitude angle of the airplane generally changes. Since the change in the pitch attitude angle causes vertical acceleration in accordance with the position in the cabin of the airplane, in the gust alleviation system of an airplane according to an embodiment of the present invention, a function of controlling the elevator may be added to reduce the vertical angular acceleration.

Turbulence accidents are typical situations in which personnel and articles float due to negative vertical acceleration, and when vertical acceleration becomes positive, floating personnel and articles fall and injuries are caused. Accordingly, in the gust alleviation system of an airplane according to an embodiment of the present invention, when entering the turbulence, a control function may be added to inhibit an accident by performing a turning flight and superimposing an acceleration caused by a centrifugal force on the gravity acceleration.

Generally, turbulent regions are distributed in a stratified manner in the altitude direction. Therefore, it often passes through the turbulent layer during altitude changes. In the gust alleviation system of an airplane according to an embodiment of the present invention, a control function for automatically interrupting the altitude change may be added when the front turbulent layer is detected during the altitude change in order to inhibit the airplane from entering the turbulent layer.

Generally, turbulent regions are distributed in a stratified manner in the altitude direction. Therefore, it often passes through the turbulent layer during altitude changes. In the gust alleviation system of an airplane according to an embodiment of the present invention, a control function for automatically interrupting the altitude change may be added when the front turbulent layer is detected during the altitude change in order to prevent the airplane from entering the turbulent layer.

The Doppler LIDAR used in the present invention may observe very weak airflow, but may not avoid observation error. Therefore, there is a possibility of outputting a signal as if there is a slight airflow change when there is no turbulence at all, and in that case, there is a risk of vibrating the airplane. Furthermore, since the control according to the present invention reduces the flight speed, the operation efficiency is reduced during operation of the control. Therefore, it is necessary to prepare the criterion that the lift control is not carried out when the intensity of the observed turbulence is low, and the lift control is carried out when it is equal to or larger than a certain threshold value. In the gust-alleviation system of an airplane according to an embodiment of the present invention, the above-described $\rho VW$ or $P_S VW$ is used as an index of the intensity of turbulence.

The intensity of turbulence may be defined by the above index, but the degree of fluctuation of an airplane differs depending on the aerodynamic characteristics and the inertial force of each airplane. Therefore, in order to determine the danger, it is also necessary to define the degree to which the airplane fluctuates. In the gust alleviation system of an airplane according to an aspect of the present invention, the components of high frequency fluctuation and low frequency fluctuation that are less likely to be related to turbulence accidents are excluded, and the value of the maximum acceleration that continues for a certain period of time is used as an index of the degree of fluctuation of an airplane.

Correspondence between the intensity index of turbulence and the index of degree of fluctuation in an individual airplane may be clarified by the flight simulation and the flight test. In other words, it is sufficient to reflect the control law by examining the intensity index of the turbulence at the time of the fluctuation of the level where the control is unnecessary and the fluctuation of the level where the emergency response is necessary.

When a Doppler LIDAR is used as a measurement unit for measuring wind speed, miniaturization and weight reduction are realized by giving a condensing function of an optical telescope to a scanner for changing the direction of light waves. The scanner may be a convex prism type or a concave mirror type.

According to the present invention, even when a monocular LIDAR is used, it is possible to reduce vertical fluctuation of the airplane when the airplane encounters turbulence, and it is possible to expect improvement in safety and comfort of the airplane.

In 7-2-6B of Part III of the Airworthiness Examination Procedure shown in Non-Patent Literature 3, the maximum speed at the time of entering turbulence is defined, and in the invention state, the maximum speed may need to be decelerated at the time of flying in an airspace where turbulence may occur, but according to the present embodiment, the maximum speed may be decelerated at the time of detecting turbulence, so that improvement in operation efficiency and regularity may be expected.

Hereinafter, an embodiment of the present invention will be described with reference to the drawings.

[Configuration of Gust Alleviation System]

Figure 4:
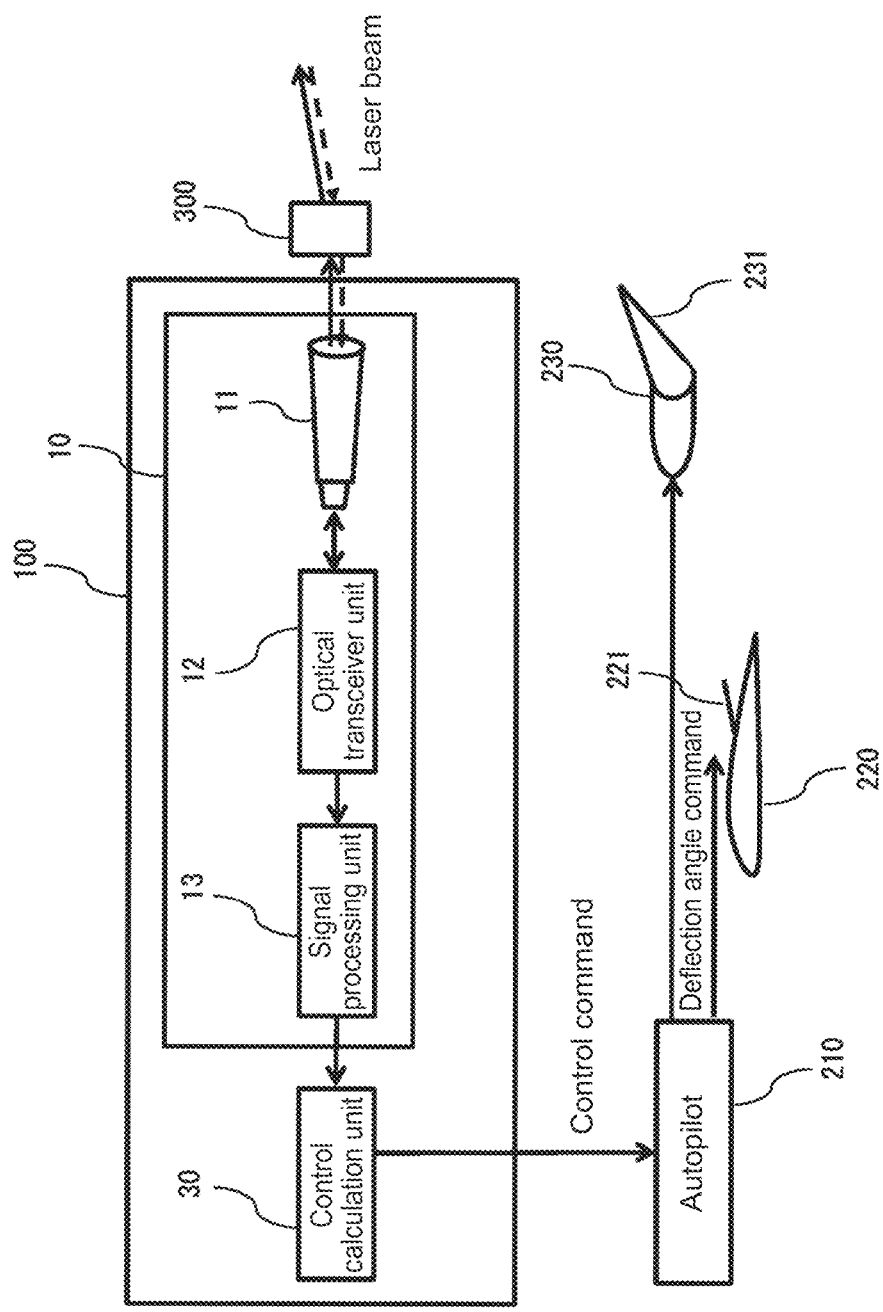
FIG. 4 A block diagram showing a configuration of a gust alleviation system of the Doppler LIDAR system to be mounted on an airplane according to an embodiment of the present invention.

FIG. 4 is a block diagram illustrating a configuration of a gust alleviation system mounted on an airplane according to an embodiment of the present invention.

As shown in FIG. 4, the control command generating unit 100 of the gust alleviation system of the airplane includes a measurement unit 10 and a control calculation unit 30. The scanner 300 is a component for changing the emission direction of the laser light, but is not an essential component for the implementation of the present invention. This is because the angle of attack and the sideslip angle of the airplane during cruising do not change greatly, and when the application of the present invention is limited only to coping with the turbulence of a short distance, the region to be observed does not change greatly.

<Measurement Unit>

The measurement unit 10 radiates the laser light in the atmosphere in a pulse shape, receives the reflected light, and measures the wind speed based on the Doppler shift amount of the frequency between the emitted laser light and the reflected light in the optical axis direction (radiation axis direction), and includes the optical telescope 11, the optical transceiver unit 12, and the signal processing unit 13.

The optical telescope 11 emits a laser light (transmitted light) generated by the optical transceiver unit 12 toward the atmosphere. The emitted laser light is scattered by minute aerosol particles suspended in the atmosphere. The scattered light is received by light transmitting and the receiving unit 12 via the optical telescope 11.

The optical transceiver unit 12 generates a single wavelength, e.g., 1.5 μm laser light, and receives the scattered light in the atmosphere to convert the difference in frequency between the emitted laser light and the scattered light into an electrical signal.

The signal processing unit 13 calculates the wind speed for each distance by time-dividing the difference signal of the frequency. That is, the received light (scattered light) received through the optical telescope 11 is compared with the transmitted light, and the wind speed is obtained from the change in frequency caused by the Doppler effect. The amount of frequency change due to the Doppler effect is typically used to measure the wind speed. This is generally called a Doppler LIDAR, and the LIDAR is an abbreviation of "Light Detection And Ranging" by a remote observation method using light. The maximum observation distance is approximately 1 to 30 km, and this value varies depending on atmospheric conditions. For ordinary passenger airplanes, this distance corresponds to a flight distance of 4 to 150 seconds.

Figure 5:
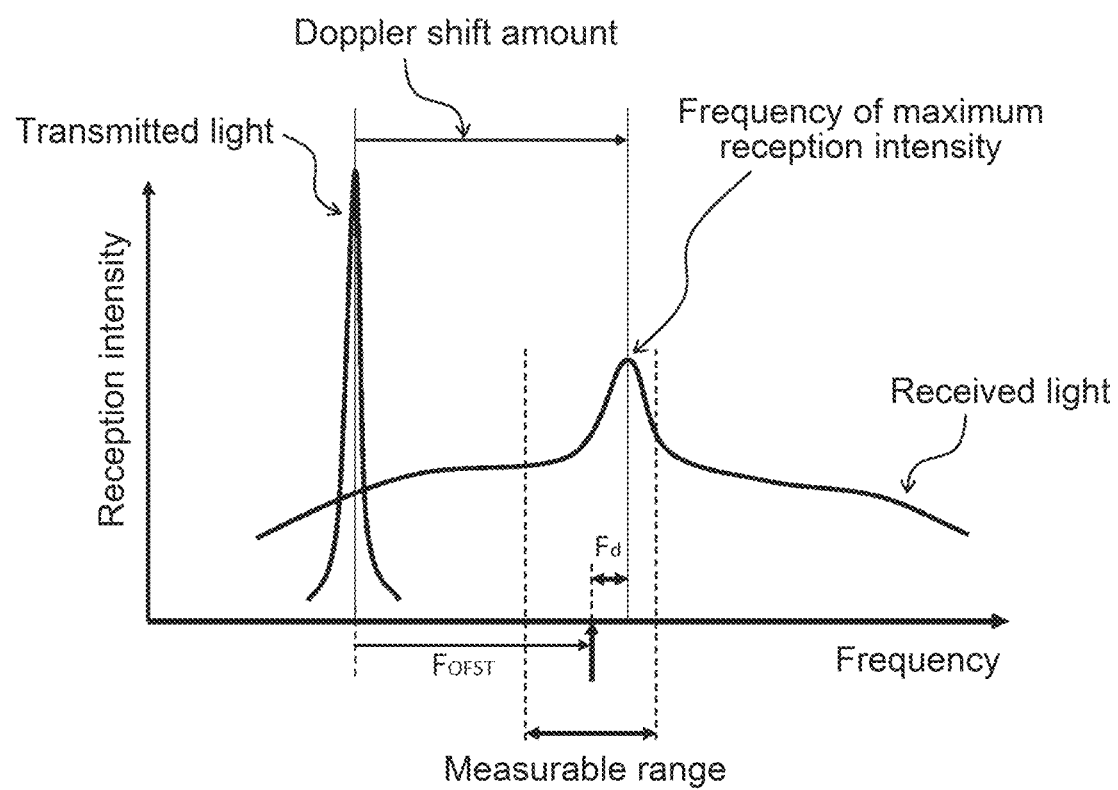
FIG. 5 An explanatory diagram showing a method of expanding the measurement range of the wind speed according to an embodiment of the present invention.

In calculating the wind speed, since the measurable range of the frequency is generally limited due to the limitation on the hardware, an approximate value of the true airspeed is used as an offset as shown in FIG. 5. In this case, the Doppler shift amount of the frequency is $F_{OFST}+F_d$. The measurable range of wind speed with the prototype equipment is ±40 m/s.

Figure 6A:
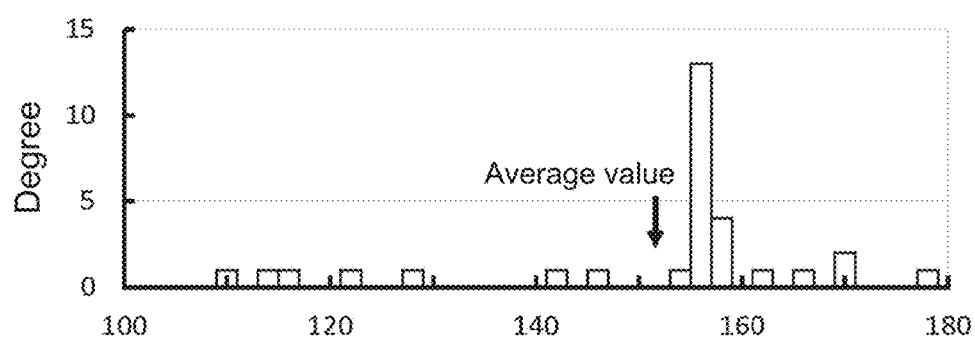
FIGS. 6A and 6B Explanatory diagrams showing an effect of a method of calculating a rough value of the true airspeed according to an embodiment of the present invention.
Figure 6B:
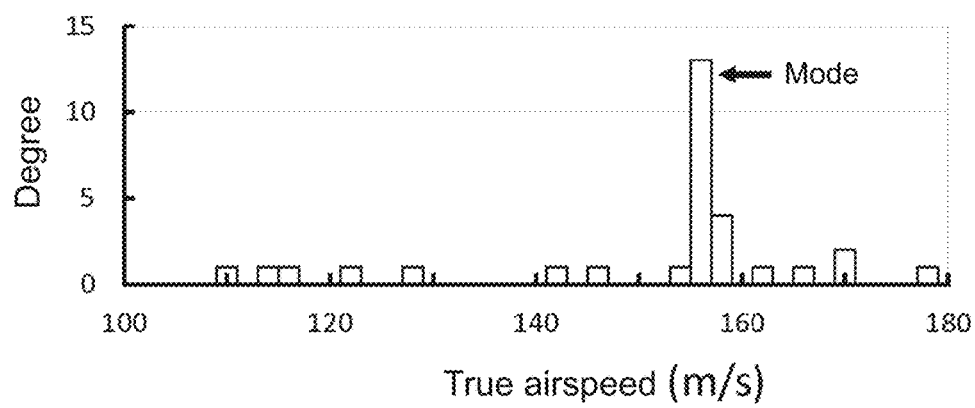

As a method for obtaining the approximate value of the true airspeed, Patent Literature 5 regards the average value of the immediately preceding observation value as the true airspeed, but since the observation value may include abnormal values, it has been found that the error may become large in the average value as shown in FIGS. 6A and 6B. For this reason, in the gust alleviation system of an airplane according to an embodiment of the present invention, the mode (mode value) of the observed value 1 to 3 seconds ago is regarded as the true airspeed. At this time, for only the observation range of the high reliability such as, for example, 7 dB or more of the signal to noise ratio of the received signal, the mode (mode value) may be calculated.

In order to calculate the mode (mode value), it is necessary to generate a histogram by dividing the observed value in a finite wind speed range, so that the resolution of the true airspeed measurement value will depend on the division width of the wind speed. Since the division width of the wind speed is suitably 2 to 5 m/s, the resolution is also the numerical value. Note that the true airspeed may be an approximate value with low resolution, since it is only necessary to take the wind speed observable range into account.

When used for the purpose of measuring the true airspeed itself as a function derived from the present invention, if an abnormal value exceeding 1σ, for example, is excluded from the histogram of the latest observation value based on the standard deviation and an average value of only the normal observation value is obtained, the true airspeed with high reliability and high accuracy may be obtained. Using static pressure information, it is also possible to convert true airspeed to equivalent airspeed.

<Control Operation>

The control calculation unit 30 transmits the deflection angle command of the elevator 231 to the autopilot 210 so as to have an angle of attack with a small lift-curve slope, when it is found that the airplane 200 receives a gust based on the wind speed value in the planned flight direction measured by the measurement unit 10. The deflection angle is gradually changed, and the angle of attack is fed back to set the target angle of attack. In addition, a deflection angle command of the spoiler 221 is transmitted to the autopilot 210 so that the lift does not change.

The angle of attack with the smallest lift-curve slope is the angle of attack at which the lift coefficient becomes the maximum value, and the angle of attack may be obtained by a wind tunnel test, for example, as shown in Non-Patent Literature 2. In order to apply the present invention, it is necessary to investigate in advance the maximum lift coefficient for each spoiler angle and the angle of attack at that time in a wind tunnel test or the like.

In order to reduce the effect of vertical wind $W_Z$, if the elevator 231 is operated automatically and slowly toward the angle of attack at which the lift coefficient reaches its maximum value 3 to 10 seconds prior to the encounter of turbulence, the airplane temporarily ascents and the flight speed decreases. At this time, if the deflection angle of the spoiler 221 is appropriately increased by feeding back the lift rate, the lift and weight are balanced and the lift rate becomes 0. Although the flight speed decreases further with time and the lift decreases thereafter, the climb rate remains at 0 because the deflection angle control of the spoiler 221 is fed back. After further time has elapsed, the airplane may descend even if the deflection angle of the spoiler 221 becomes 0, but the thrust is increased to maintain horizontal flight before that. Alternatively, the airplane may descend in a situation where an operation descending is permitted.

Since the angle of attack at the time of the maximum lift coefficient also changes slightly according to the spoiler angle, it is necessary to feed back the spoiler angle to control the elevator 231 for adjusting the angle of attack.

Figure 7:
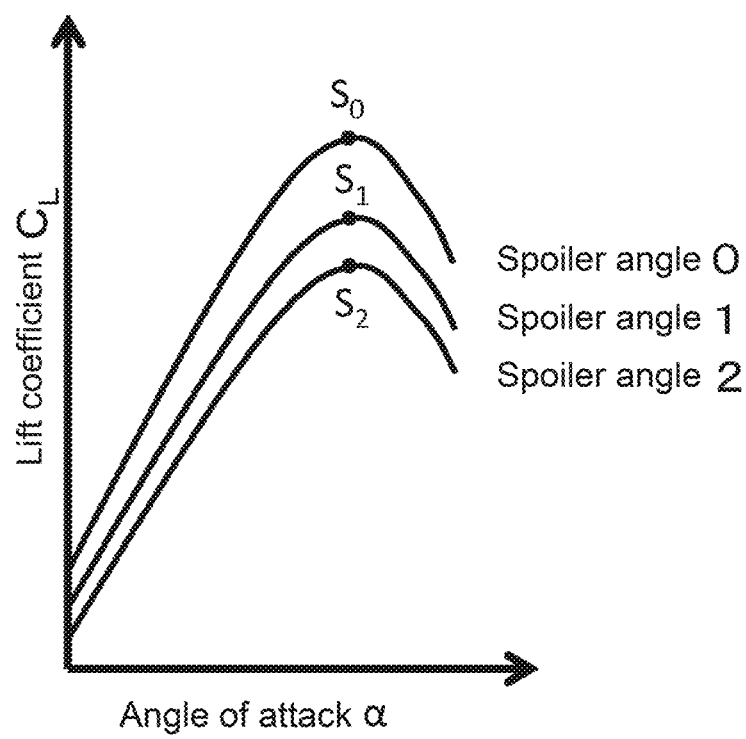
FIG. 7 An explanatory view showing a principle of reducing the vertical fluctuation of the airplane due to the influence of the longitudinal wind according to an embodiment of the present invention.

With regard to the influence of the fore-and-aft wind $W_X$, as shown in FIG. 7, when the front wind speed observed by the Doppler LIDAR is taken as $W_X$ when flying at the angle of attack at the point $S_1$ as the spoiler angle 1, the lift coefficient when encountering $W_X$ is $C_L'$ obtained by Equation 8, and thereby the lift before and after encountering $W_X$ may be the same.

$$C_L'=(V/(V+W_X))^2 C_L \tag{8}$$

When $W_X$ is positive, the spoiler angle is increased so that the lift coefficient becomes $C_L'$ at the $S_2$ side, and when $W_X$ is negative, the spoiler angle is reduced so that the lift coefficient becomes $C_L'$ at the $S_0$ side. Since the wind speed by the Doppler LIDAR may be observed independently for each distance, the change in the wind speed in the time series may be obtained, and the spoiler angle may be changed according to the time series. In addition, since the observations are updated, for example, with a period of 5 Hz, the new observation information may be weighted higher to provide robustness to the control.

The control surface controlling the lift may be a flapperon rather than a spoiler. Alternatively, it may be a dedicated control surface for reducing fluctuation or a flap that operates at a high speed. Multiple control surfaces may be used in combination.

Figure 8:
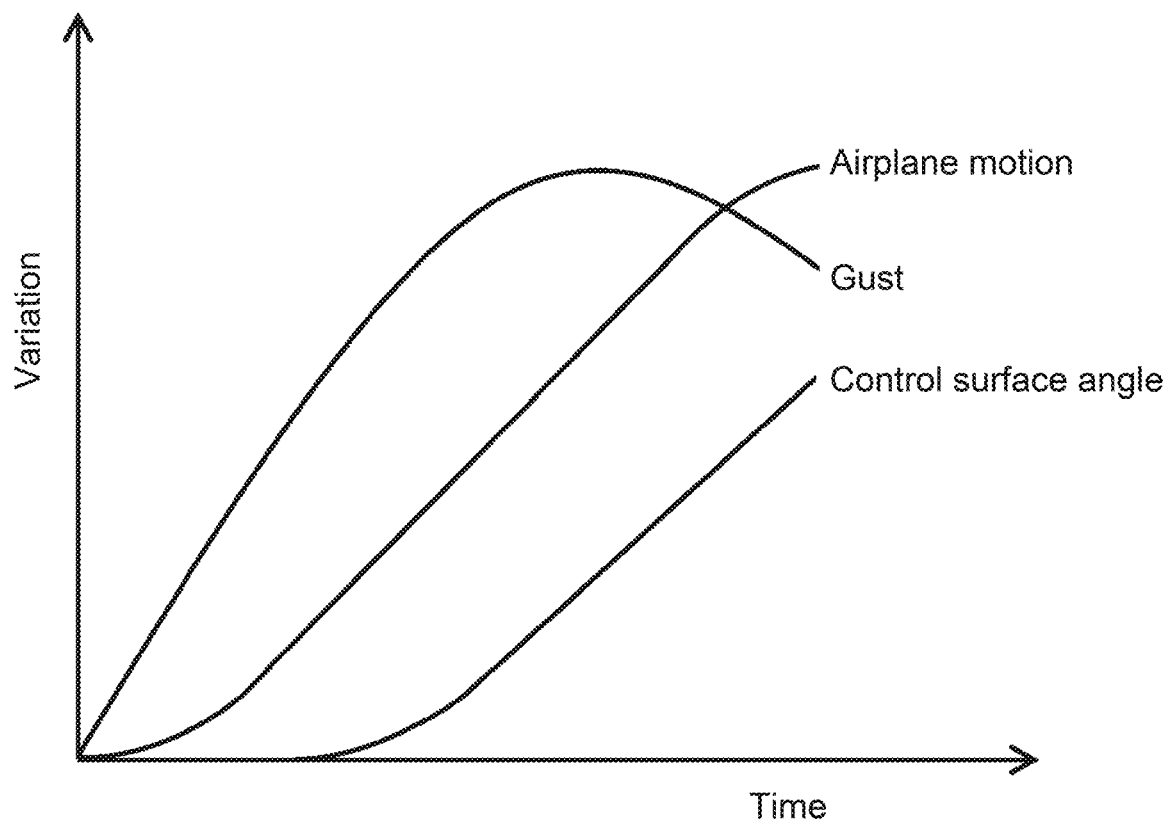
FIG. 8 A diagram schematically illustrating a delay of the conventional feedback control.

In the case of the conventional feedback control which reduces the fluctuation of the airplane, the deflection angle is usually controlled based on the output of the acceleration sensor attached to the airplane. In this case, as shown in FIG. 8, the inertial force of the airplane delays from the time when the airplane first encounters a gust until the airplane moves. Furthermore, the motion of the airplane is measured by an acceleration sensor to calculate an appropriate deflection angle, and then the deflection angle command is sent to the actuator of the control surface, but a delay occurs even until the aerodynamic force of the control surface is changed.

Therefore, there is a possibility that it may not cope with a fine fluctuation having a high frequency, or that it is excited conversely.

In contrast, in the case of the preview control based on the remote airflow according to the present invention, since it is possible to control the control surface in advance in anticipation of a delay, the effect of the average delay does not occur, and only a slight effect such as observation error and deflection angle error of the remote airflow remains. Therefore, not only accident reduction but also improvement of riding comfort may be expected, because it may cope with even fine fluctuation with high frequency.

As described above, when the spoiler is dynamically maneuvered, the moment coefficient $C_m$ may change slightly. As a result, pitching occurs to cause vertical acceleration proportional to the angular acceleration according to the position in the cabin of the airplane, so that the variation $C_m \delta_{SP}$ of $C_m$ according to the spoiler angle may be obtained in advance by the wind tunnel test, and the elevator may also be changed according to the spoiler angle.

Figure 9:
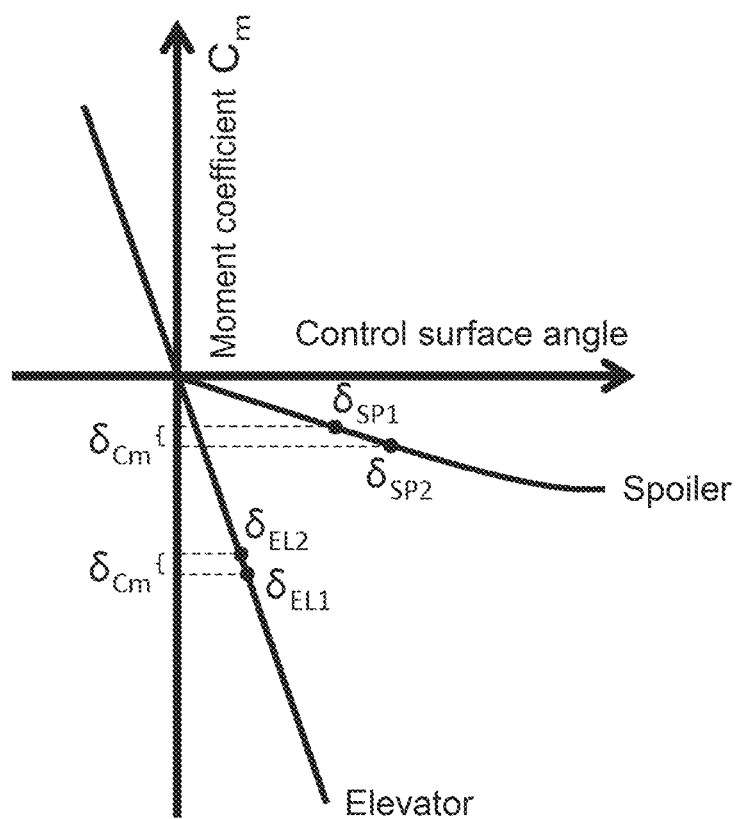
FIG. 9 An explanatory diagram of a control for canceling the pitching moment according to an embodiment of the present invention.

Specifically, as shown in FIG. 9, the characteristic of the change amount $C_m \delta_{SP}$ of $C_m$ in accordance with the spoiler angle and the characteristic of the change amount $C_m \delta_{EL}$ of $C_m$ in accordance with the ascending/descending angle are determined in advance. Assuming that the spoiler angle at a certain point is $\delta_{SP1}$, if a command to change the spoiler angle to $\delta_{SP2}$ is issued for the control in accordance with the present invention, since $C_m$ changes by $\delta_{Cm}$, in order to cancel this moment, if the elevator angle at that point is $\delta_{EL1}$, a command such that the elevator angle becomes $\delta_{EL2}$, which will generate the opposite moment, is issued simultaneously. Since the elevator angle control for changing the angle of attack according to the present invention is quasi-static control and the elevator angle control for canceling the pitching moment is dynamic control, compatibility is possible.

$C_m\delta_{SP}$ may be determined by flight testing. Conventional functions may be utilized in which the signal of the angular acceleration sensor is fed back to control the elevator to suppress angular acceleration.

In order to suppress the vertical acceleration becomes negative, the control calculation unit 30 may transmit a turning command to the autopilot 210 when detecting the front turbulence. For example, when the airplane is turned at a bank of 30 degrees, which is permitted by the operation of a normal passenger airplane, the vertical acceleration is increased by about 15%, so that it is possible to reduce the possibility of the personnel and the articles rising.

For example, using the technique of Patent Literature 6, the left and right turning direction may be determined, and a turning flight may be performed for avoiding the turbulence in a weak turbulence direction even a little.

Figure 10:
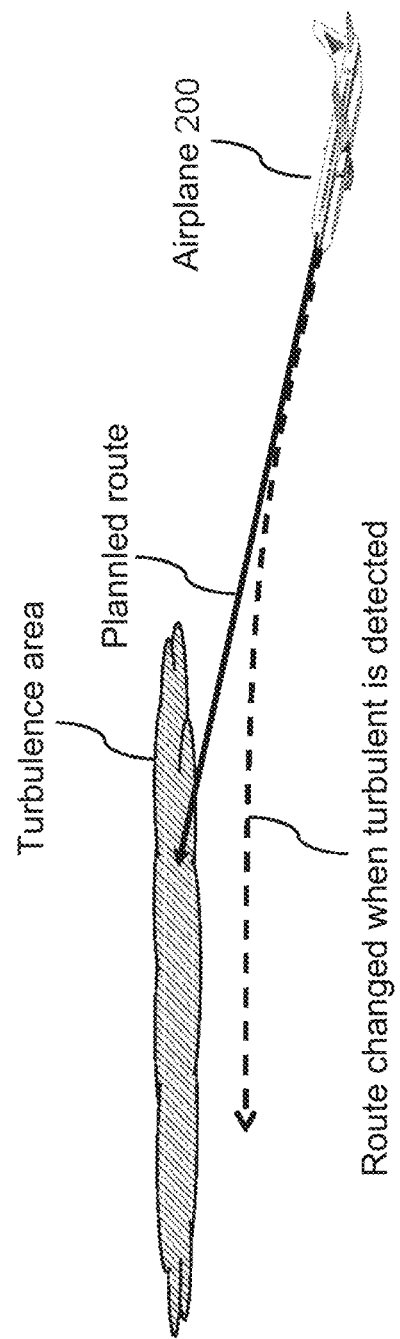
FIG. 10 A diagram schematically illustrating a turbulence avoidance by altitude change stop according to an embodiment of the present invention.

If the turbulent air layer is detected in front during the altitude change, the control calculation unit 30 may transmit a command to stop the altitude change to the autopilot 210. As shown in FIG. 10, the turbulence area is often distributed in a layered shape in the altitude direction, and if it is detected in advance by a Doppler LIDAR, the entry into the turbulent layer may be avoided if the altitude change is stopped. The same is true whether it is climbing or descending.

As a criterion for determining whether or not the turbulence is to be dealt with, the above-mentioned $\rho VW$ or $P_S VW$ is used as an index of the intensity of the turbulence. Especially for $P_S VW$, $P_S$ is easy to use because it is static pressure used for the barometric altimeter. The wind speed change amount W is assumed to be isotropic in the turbulent airflow, and the above-mentioned change amount of the wind speed in the optical axis direction is assumed to be W. The VW may be obtained by using the Fh-factor shown in the "method of detecting turbulence" of Patent Literature 4. Since Fh-factor calculates the difference between the two measurement values, if either or both of the two measurement values is poor, an invalid numerical value is calculated. Therefore, as a technique for obtaining W by one measurement, the "remote turbulence detection method and apparatus for implementing the same" of Patent Literature 7 uses the spectral width of the received signal. However, it is proven that the error occurred in the estimation of the wind speed width in the real laser equipment, because the spectral width of the transmitted signal is not 0.

According to the present invention, to solve the above problem, as the optical axis direction wind speed change amount W, the value obtained by subtracting the power spectral width of the transmitted light from the power spectral width of the scattered light received by the optical transceiver unit 12, i.e., the amount of increase in the power spectral width due to scattering, is proportional to the amount of change in the optical axis direction wind speed. Therefore, the optical axis direction wind speed change amount W (standard deviation of the wind speed in the range bin) is given as follows.

$$W=\lambda(fdr-fdt)^2 \quad (9)$$

Here, $\lambda$ is the wavelength of the laser light, fdr is the power spectral width of the received light, and fdt is the power spectral width of the transmitted light. Since W is the standard deviation of the wind speed, it is proportional to the amount of the wind speed change.

In $P_S VW$, V may be a true airspeed value according to the present disclosure, or may be determined from an airspeed sensor normally mounted on an airplane.

When W is an airflow change less than the observation accuracy (for example, 0.22 m/s or less), it is more appropriate not to perform the control even if the airflow change is observed, because it may be reversely excited by the control surface control. Alternatively, the control gain may be changed in accordance with the observed airflow change amount.

Figure 11:
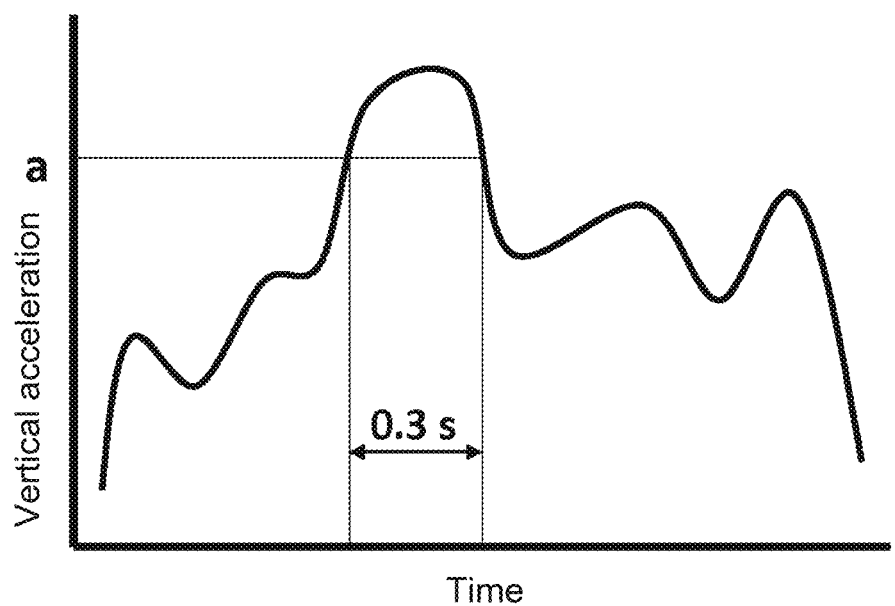
FIG. 11 An explanatory diagram showing a method of evaluating the degree of fluctuation due to turbulence according to an embodiment of the present invention.

The intensity of turbulence may be defined by the above index, but the degree of fluctuation of an airplane differs depending on the aerodynamic characteristics and the inertial force of each airplane. Therefore, an index is also necessary for the degree at which an airplane fluctuates. In the gust alleviation system of an airplane according to an embodiment of the present invention, for example, components of fluctuation of 2 Hz or more as high frequency and fluctuation of 0.1 Hz or less as low frequency are excluded since they are less likely to be related to turbulence accidents, and the value of the maximum acceleration "a" continuous for 0.3 seconds as shown in FIG. 11 is used as an index of the degree of fluctuation of an airplane. The maximum acceleration "a" may be expressed in logarithms.

Correspondence between the intensity index of turbulence and the index of degree of fluctuation in an individual airplane may be clarified by the flight simulation and the flight test. That is, it is sufficient to determine the correlation coefficient between the intensity index of the turbulence and the acceleration actually generated, and to determine the threshold value matching the human sensation. When the control surface control by the gust alleviation system of an airplane according to the present invention is performed, there may be an option that it does not correspond when the estimated fluctuation is small because a decrease in the operation efficiency is inevitable.

Example of Using a Gust Alleviation System

Figure 12:
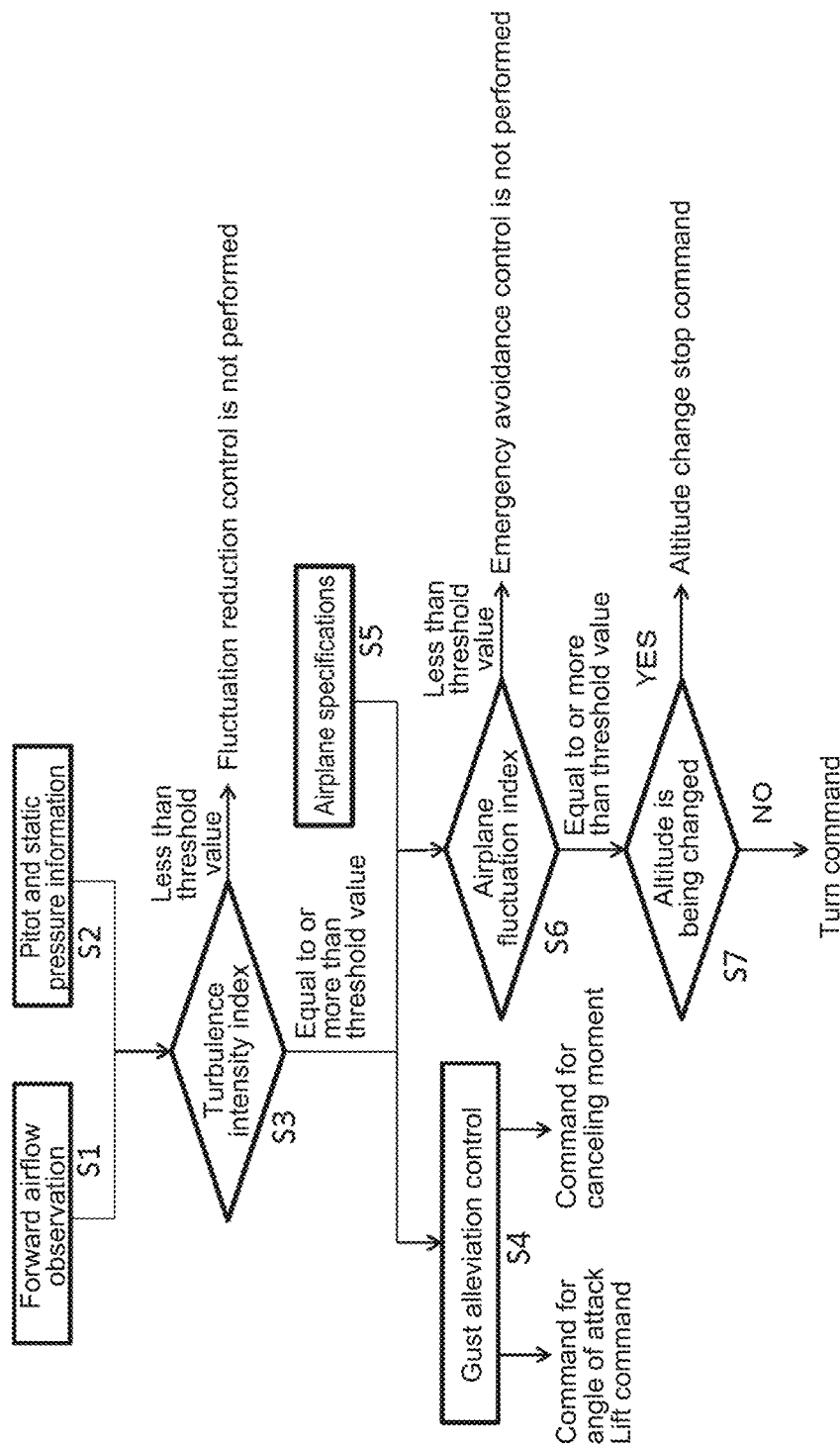
FIG. 12 A flowchart illustrating a use example according to an embodiment of the present invention.

An example of the use of the gust alleviation system of the airplane according to the present invention will be described with reference to the flowchart of FIG. 12.

Forward airflow observation according to the present invention (S1) is always performed during the flight, the turbulence intensity index including the pitot and static pressure information output from the airplane (S2) is calculated (S3), and if the turbulence intensity index is less than the threshold value set in advance, the gust alleviation control according to the present invention is not performed as coping is not required. When it is equal to or more than the threshold value, the gust alleviation control (S4) is executed, and a command for specifying an angle of attack with a small lift-curve slope, a lift command for setting the climb rate to 0, and a command for canceling the pitching moment in the elevator are issued to the autopilot. At the same time, the airplane fluctuation index is calculated (S6) from the turbulence intensity index and the airplane specifications (S5), and when the airplane fluctuation index is less than a preset threshold value, emergency avoidance control such as turning or stopping the altitude change is not performed as there is no urgency. Airplane specifications are airplane weight, flight speed, aerodynamic data, and the like. When the index is equal to or larger than the threshold value, emergency avoidance control is performed (S7), and if the altitude is being changed, an altitude change stop command is issued to the autopilot, and if the altitude is not being changed, a turn command is issued to the autopilot. Even if it could not actually avoid the turbulence, the superimposition of the vertical acceleration by the gust alleviation control according to the present invention and the turn acts effectively, it is possible to reduce the accident. Pilot decisions may intervene for emergency avoidance.

It should be noted that there is a risk of altitude decrease when a control problem according to the present invention occurs, such as when the density of aerosol particles in the atmosphere is high at a low altitude at takeoff and landing and the observation distance of the Doppler LIDAR is long, passengers wear seat belts, and flight paths may be changed by a pilot's sole judgment. Therefore, in a flight altitude of 500 m or less, it is desirable to simply provide the pilot with prior information of turbulence rather than performing the control according to the present invention.

[System Installation]

Figure 13:
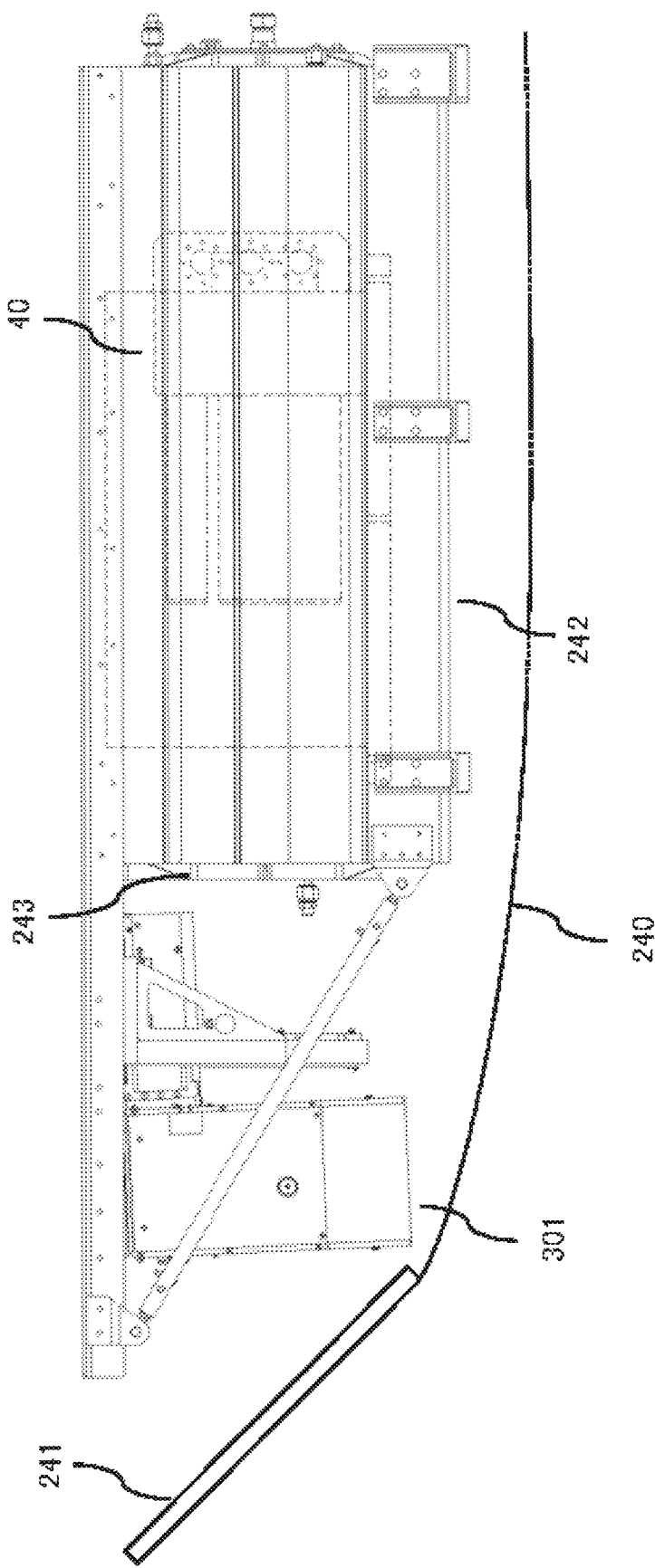
FIG. 13 A side view showing the arrangement of the prototype optical antenna and the scanner.

Since the Doppler LIDAR receives extremely weak scattered light, the larger the aperture of the optical telescope 11, the better the performance. For example, when the aperture is 150 mm, the weight of the prototype optical antenna 40 (see FIG. 13) is about 50 kg, and the weight of the prismatic scanner 301 (see FIG. 13) for changing the direction of the optical axis is about 45 kg. These are placed fore-and-aft as shown in FIG. 13. The left side of the figure shows the heading direction. The chamber 242 is for pressurizing the optical antenna 40 in the same manner as in the airplane, and light is emitted through the chamber window 243. The scanner 301 has a prism arranged in double which may be rotated by an electric motor, so that the direction of the light may be freely changed. The fairing window 241 is a window attached to the front surface of the fairing 240 that houses these devices. When a large optical telescope of 150 mm in aperture is placed in an optical antenna, high rigidity is required, and structurally weight reduction is difficult. Moreover, since extremely high optical characteristics are required for the lens used in the optical telescope 11, it is difficult to reduce the weight by using a Fresnel lens or the like.

Figure 14:
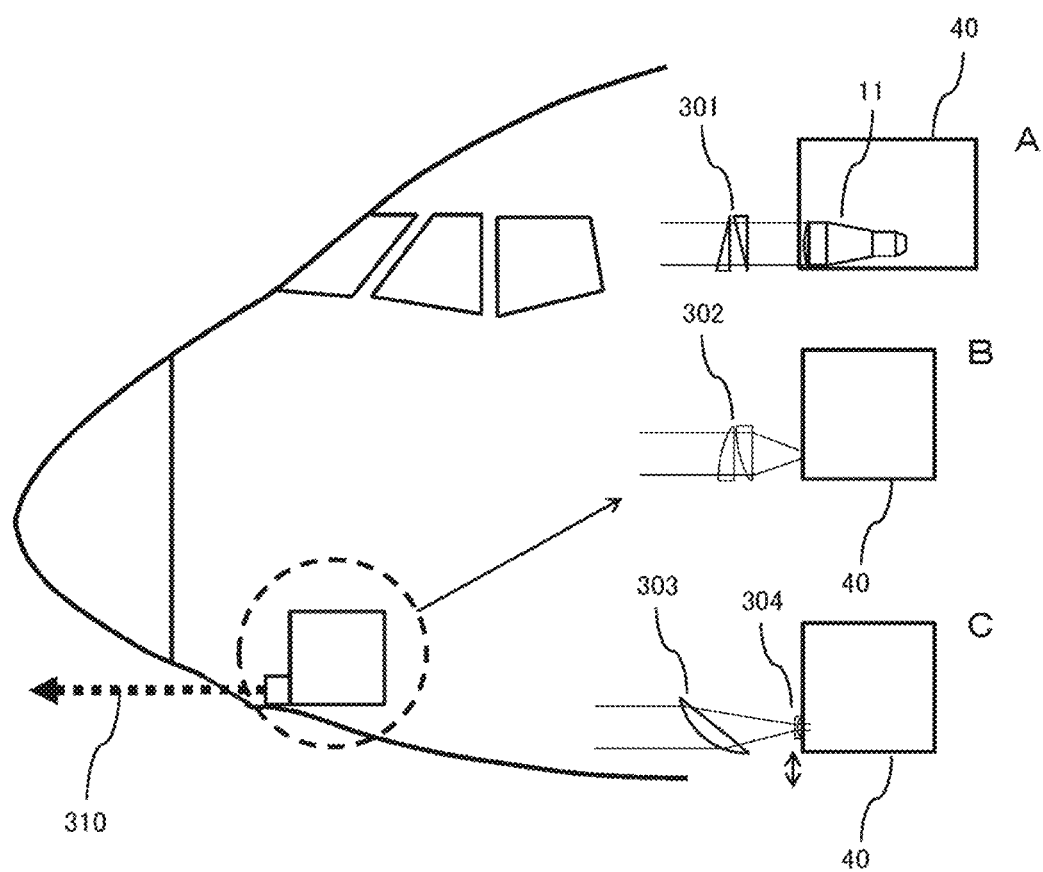
FIG. 14 A diagram schematically showing a method of mounting an optical antenna and a scanner which is a component of the present invention on an airplane.

"A" of FIG. 14 is a conventional configuration, and as shown in "B", the objective lens of the optical telescope 11 is omitted and the prism of the scanner 302 has a convex surface, so that the scanner 302 also serves as an objective lens. If the objective lens is not required, not only the weight of the objective lens but the structure for supporting the objective lens becomes unnecessary, and the optical antenna housing itself may also be miniaturized, and then it is possible to reduce the weight. Alternatively, the fairing window 303 of "C" has a convex lens so as to also serve as an objective lens, and a mechanism for changing the direction of the laser light by moving the small concave lens 304 may be provided. At this time, the optical axis of the laser always employs a mechanism such that the optical axis runs toward the center of the fairing window 303. The fairing window 303 is more than 2 cm in thickness due to the necessary for strength, making it easy to make a convex lens, and the outer fairing window 303 from the scanner 300 eliminates the need to increase the size of the fairing window 303 to ensure that the laser light is not chipped. The weight reduction effect of eliminating the scanner 300 is also large.

Figure 15:
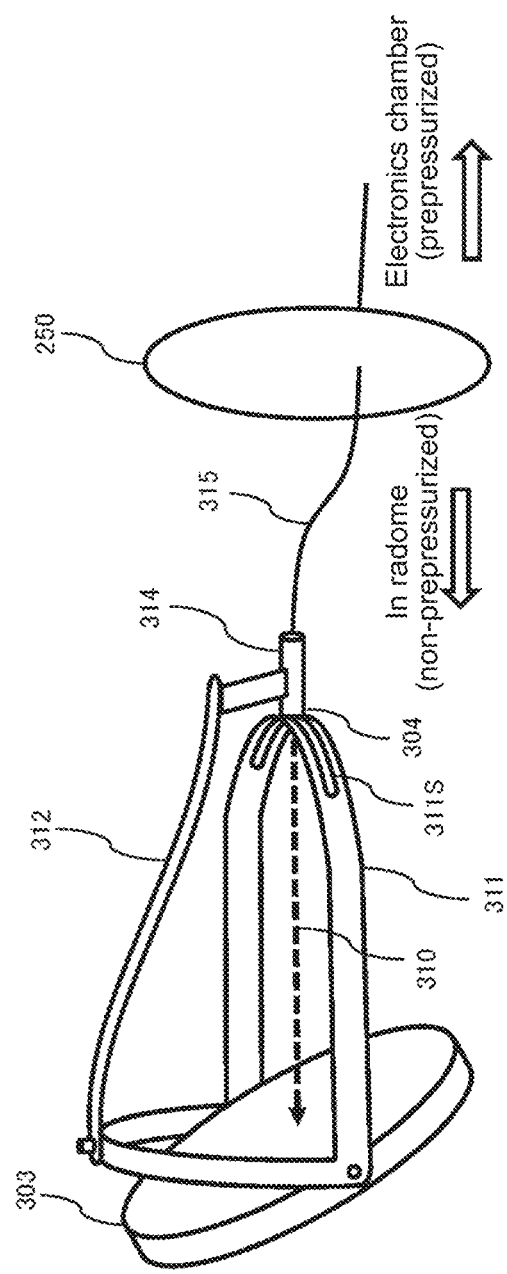
FIG. 15 An explanatory view showing an example of a specific mechanism for moving the concave small eyepiece according to an embodiment of the present invention.

FIG. 15 shows an example of a specific mechanism for moving the small concave lens 304. The elevation angle changing support 311 is attached to the frame of the convex fairing window 303, so that the optical axis 310 always faces the center of the convex fairing window 303 even if the optical axis 310 changes in the elevation direction. Change in azimuth may be realized by rotating the azimuth changing support 312, since the optical transceiver unit 314 including the small concave lens 304 attached to the distal end is fixed to the azimuth changing support 312, and since the elevation angle changing support 311 moves laterally along the slit 311S, the optical axis 310 always faces the center of the convex fairing window 303. In the case of this method, when using the optical fiber cable 315 for transmission and reception of light, it is not suitable for high output light but the structure is simplified, and it is possible to place the optical transceiver unit in the non-prepressurized portion such as the inside of the radome outside of the pressure bulkhead 250. As a result, the chamber 242 and the chamber window 243 are not required, as shown in FIG. 13. Incidentally, in the normal design, since a convex lens firstly makes the output light which diffuses at the optical fiber cable 315 outlet parallel rays, in order to diffuse the output light in accordance with the aperture of a convex fairing window 303, a concave lens 304 is provided, but a convex lens 304 may be alternatively provided by integrating the convex lens and the lens 304.

Figure 16:
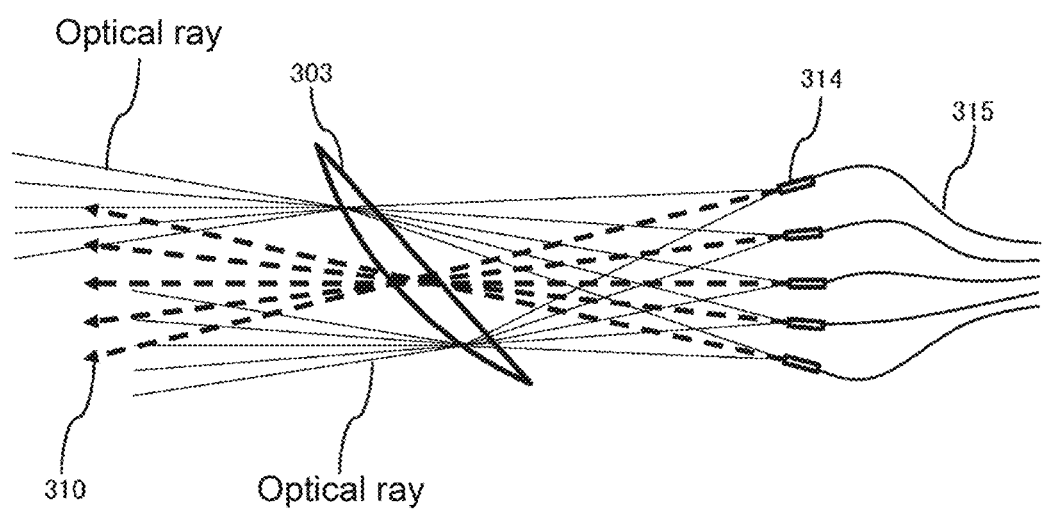
FIG. 16 An explanatory view in the case of using a plurality of light emitting portions according to an embodiment of the present invention.
Figure 17:
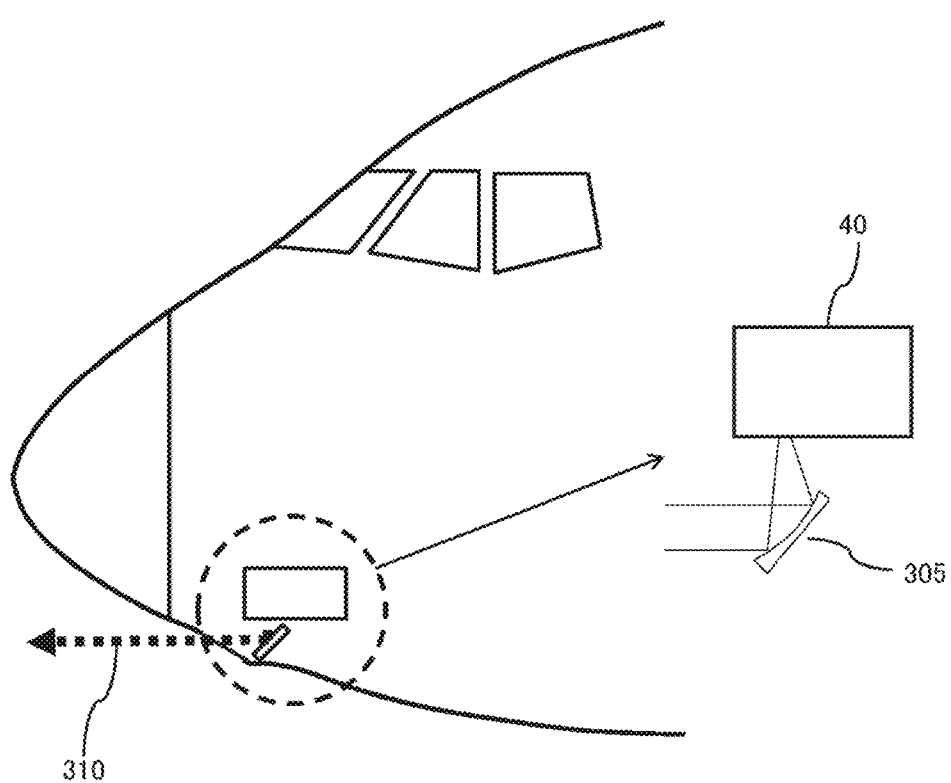
FIG. 17 A diagram schematically showing another method of mounting an optical antenna and a scanner, which are components of the present invention, on an airplane.

On the other hand, rather than moving the small concave lens 304, if equipped with a plurality of optical transceiver units 314 as shown in FIG. 16, it is possible to observe a plurality of directions at the same time. In this case, since a plurality of cable 315 is provided, it is also possible to emit light of equivalently high output.

Where the scanner 300 is not a prism type but a mirror type, the concave mirror 305 as shown in FIG. 17 also serves as an objective lens. To change the optical axis, it is sufficient to rotate the concave mirror 305.

Figure 18:
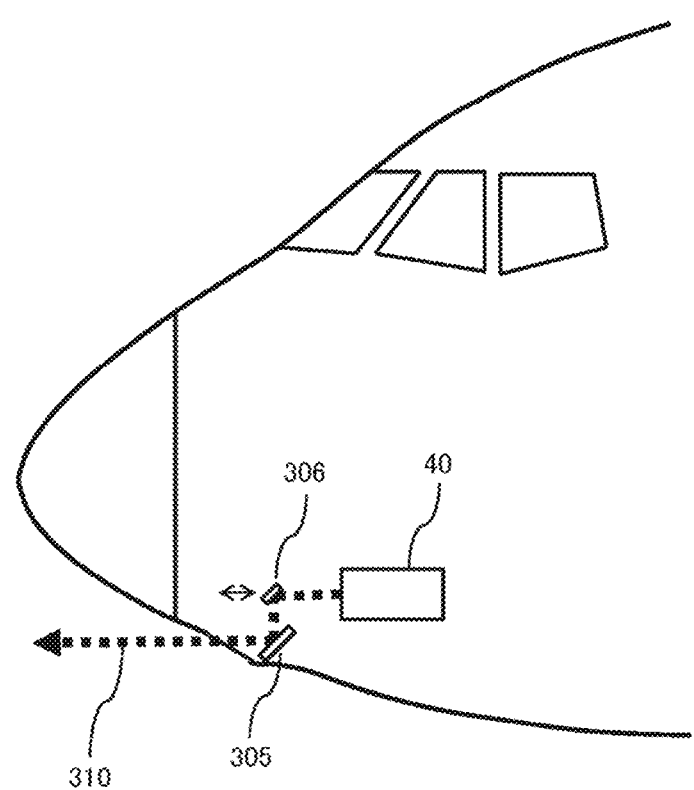
FIG. 18 A diagram schematically showing yet another method of mounting an optical antenna and a scanner, which are components of the present invention, on an airplane.

When changing the laser light direction by rotating the concave mirror 305 shown in FIG. 17, since a margin is required in the dimensions of the fairing, the protrusion outside the airplane is increased, and there is a possibility that the drag and aerodynamic noise is increased. Therefore, as shown in FIG. 18, there may be used a mechanism for changing the elevation (elevation angle) of the laser light by rotating the small convex mirror 306 so that the optical axis faces the center of the concave mirror 305 at the same time as moving the small convex mirror 306 fore-and-aft. To change the azimuth (direction) of the laser light may be a mechanism for rotating the concave mirror 305 in the azimuth direction.

Figure 19:
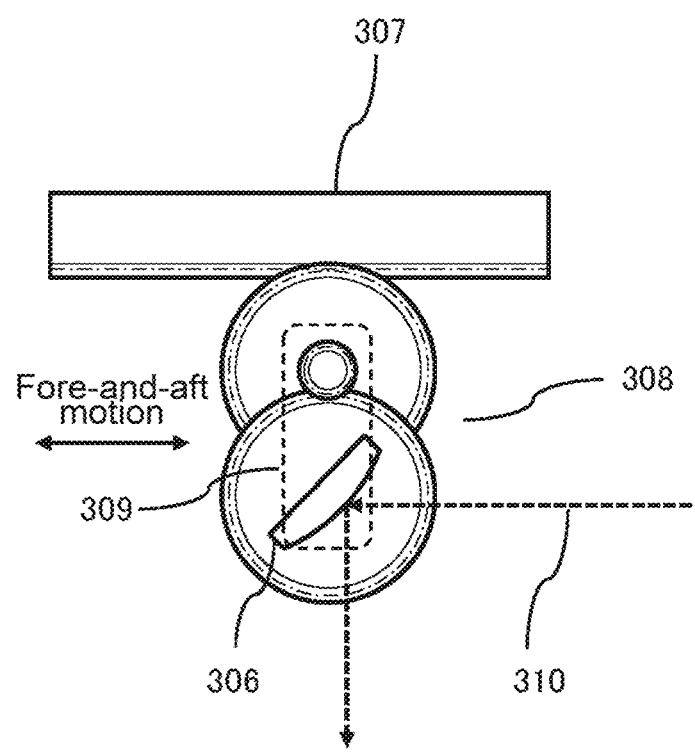
FIG. 19 An explanatory view showing an example of a specific mechanism for rotating a small convex mirror according to an embodiment of the present invention simultaneously with the longitudinal motion using a rack gear and a reduction gear.

An example of a specific mechanism for rotating the small convex mirror 306 simultaneously with fore-and-aft motion using the rack gear 307 and the reduction gear 308 is shown in FIG. 19. The rack gear 307 is fixed to the airplane, and the small convex mirror 306 rotates when the support 309 of the reduction gear 308 is moved fore-and-aft. By appropriately setting the gear ratio of the reduction gear 308, it is possible to design the optical axis 310 that always faces the center of the concave mirror 305. At this time, when it is necessary to finely adjust the angle change amount of the small convex mirror 306, an oval gear may be used for the reduction gear 308.

Figure 20:
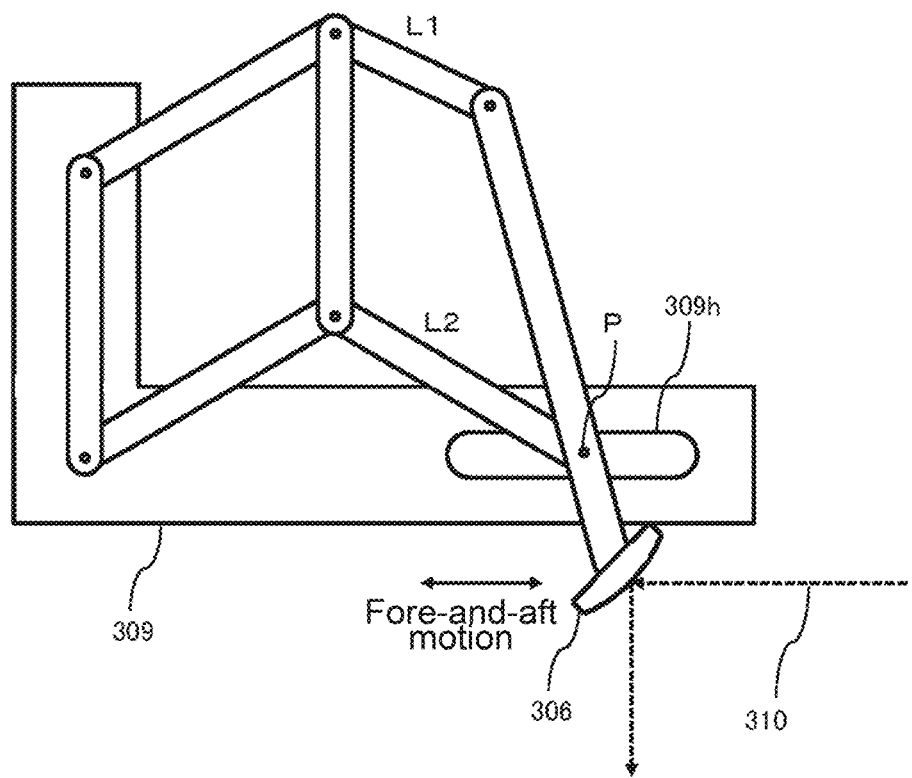
FIG. 20 An explanatory view showing an example of a specific mechanism for rotating a small convex mirror according to an embodiment of the present invention simultaneously with the longitudinal motion using a linkage mechanism.

An example of a specific mechanism for rotating the small convex mirror 306 simultaneously with fore-and-aft motion using a linkage mechanism is shown in FIG. 20. When the small convex mirror 306 is moved fore-and-aft, the point P moves linearly along the slot 309h formed in the support, but because L1 is shorter than L2, the small convex mirror 306 is accompanied by a rotational motion. At this time by appropriately setting the ratio of the length of L1 and L2, it is possible to design the optical axis that always faces the vicinity of the center of the concave mirror 305.

[Notes]

More than half of accidents of passenger airplanes are related to turbulence, and reducing turbulence accidents is an urgent issue. For this reason, in the case of passenger airplane, weather radar equipment is mandatory, and although it is possible to find cumulonimbus clouds that generate turbulence, turbulence that occurs in clear weather conditions may not be detected.

On the other hand, a Doppler LIDAR has a feature that remote airflow may be observed in clear weather, but the short effective observation range has been pointed out by pilots of airlines, and it has become a foothold for practical application. Where even in a short observation range of about 1 km, the gust alleviation system of the present invention may be suitably applied as a means for reducing airplane fluctuation when an airplane encounters turbulence.

Although the present invention has been described on the assumption that the use of a Doppler LIDAR using light waves which is a kind of electromagnetic waves, it may be applied to a Doppler radar using radio waves.

REFERENCE SIGNS LIST 10 measurement unit
11 optical telescope
12 optical transceiver unit
13 signal processing unit
30 control calculation unit
40 optical antenna
100 control command generating unit
200 airplane
210 autopilot
221 spoiler
231 elevator
240 fairing
241 fairing window
242 chamber
243 chamber window
250 pressure bulkhead
300, 301, 302 scanner
303 fairing window
304 small concave lens
305 concave mirror
306 small convex mirror
307 rack gear
308 reduction gear
309 support
309h slot
310 optical axis
311 elevation angle changing support
311S slit
312 azimuth changing support
314 optical transceiver unit
315 optical fiber cable

The invention claimed is:

1. A gust alleviation system of an airplane, comprising:
   a measurement unit that emits electromagnetic waves toward a planned flight direction of the airplane, receives scattered waves of the emitted electromagnetic waves in atmosphere, and measures a remote wind speed in a radiation axis direction of the emitted electromagnetic waves based on a Doppler shift amount of a frequency between the emitted electromagnetic waves and the scattered electromagnetic waves;
   a control surface that controls a lift of the airplane; and
   a control calculation unit that calculates:
      a first lift change caused by a change of an angle of attack due to a gust based on a first product of a density of an atmosphere or a static pressure, a flight speed, and a vertical component of the gust;
      an angle of attack with less lift-curve slope based on the first lift change;
      a second lift change caused by a dynamic pressure change due to the gust based on a product of the density of the atmosphere, the flight speed, and a fore-and-aft component of the gust; and
      an angle of the control surface that controls the lift so that the lift does not change based on the second lift change when it is determined that the airplane will receive a gust, based on a measurement result of the measurement unit.

2. The gust alleviation system of an airplane according to claim 1, wherein the measurement unit includes a signal processing unit that obtains a mode on a histogram of each wind speed measurement value of each range bin to obtain a true airspeed for determining a wind speed measurement range.

3. The gust alleviation system of an airplane according to claim 1, further comprising:
   a function of automatically controlling an elevator based on aerodynamic data to reduce an angular acceleration of the airplane.

4. The gust alleviation system of an airplane according to claim 1, further comprising:
   a function of superimposing a positive vertical acceleration caused by turning on a gravity acceleration.

5. The gust alleviation system of an airplane according to claim 1, further comprising:
   a function of automatically interrupting altitude change when a turbulent layer is detected during the altitude change.

6. The gust alleviation system of an airplane according to claim 1, wherein the control calculation unit uses, as an intensity index of a turbulence, a product of a wind speed change amount in a radiation axis direction of electromagnetic waves radiated, flight speed, and a density of the atmosphere or a static pressure.

7. The gust alleviation system of an airplane according to claim 6, wherein the control calculation unit that determines a wind speed width in a range bin from an increase in a power spectral width of scattering in the range bin as the amount of wind speed change in the radiation axis direction, and represents a value of an intensity of a turbulence by the wind speed width.

8. The gust alleviation system of an airplane according to claim 1, wherein the control calculation unit, as an index of a degree that the airplane fluctuates, removes a high component and a low component of frequency of fluctuation and uses a value of maximum acceleration that continuous for a fixed time period.

9. The gust alleviation system of an airplane according to claim 1, wherein the measurement unit uses light waves as the electromagnetic waves emitted, and
   wherein the system further comprises a scanner that changes a direction of the light waves and has a condensing function of an optical telescope.

10. The gust alleviation system of an airplane according to claim 1, wherein the control calculation unit calculates:
   the angle of attack corresponding to a region close to a stall point of lift characteristics including a front side region, the stall point, and a back side region; and
   an angle of a control surface that controls the lift to reduce ascending of the airplane due to increase of the calculated angle of attack, and to maintain horizontal flight.

11. A gust alleviation method of an airplane, comprising:
   emitting electromagnetic waves toward a planned flight direction of the airplane, receiving scattered waves of the emitted electromagnetic waves in atmosphere, and measuring a remote wind speed in a radiation axis direction of the emitted electromagnetic waves based on a Doppler shift amount of a frequency between the emitted electromagnetic waves and the scattered electromagnetic waves;
   controlling, by a control surface, a lift of the airplane;
   calculating a first lift change caused by a change of an angle of attack due to a gust based on a first product of a density of an atmosphere or a static pressure, a flight speed, and a vertical component of the gust;
   calculating an angle of attack with less lift-curve slope based on the first lift change;
   calculating a second lift change caused by a dynamic pressure change due to the gust based on a product of the density of the atmosphere, the flight speed, and a fore-and-aft component of the gust; and
   calculating an angle of the control surface that controls the lift so that the lift does not change based on the second lift change when it is determined that the airplane will receive a gust, based on a measurement result.

* * * * *